Figure 1:
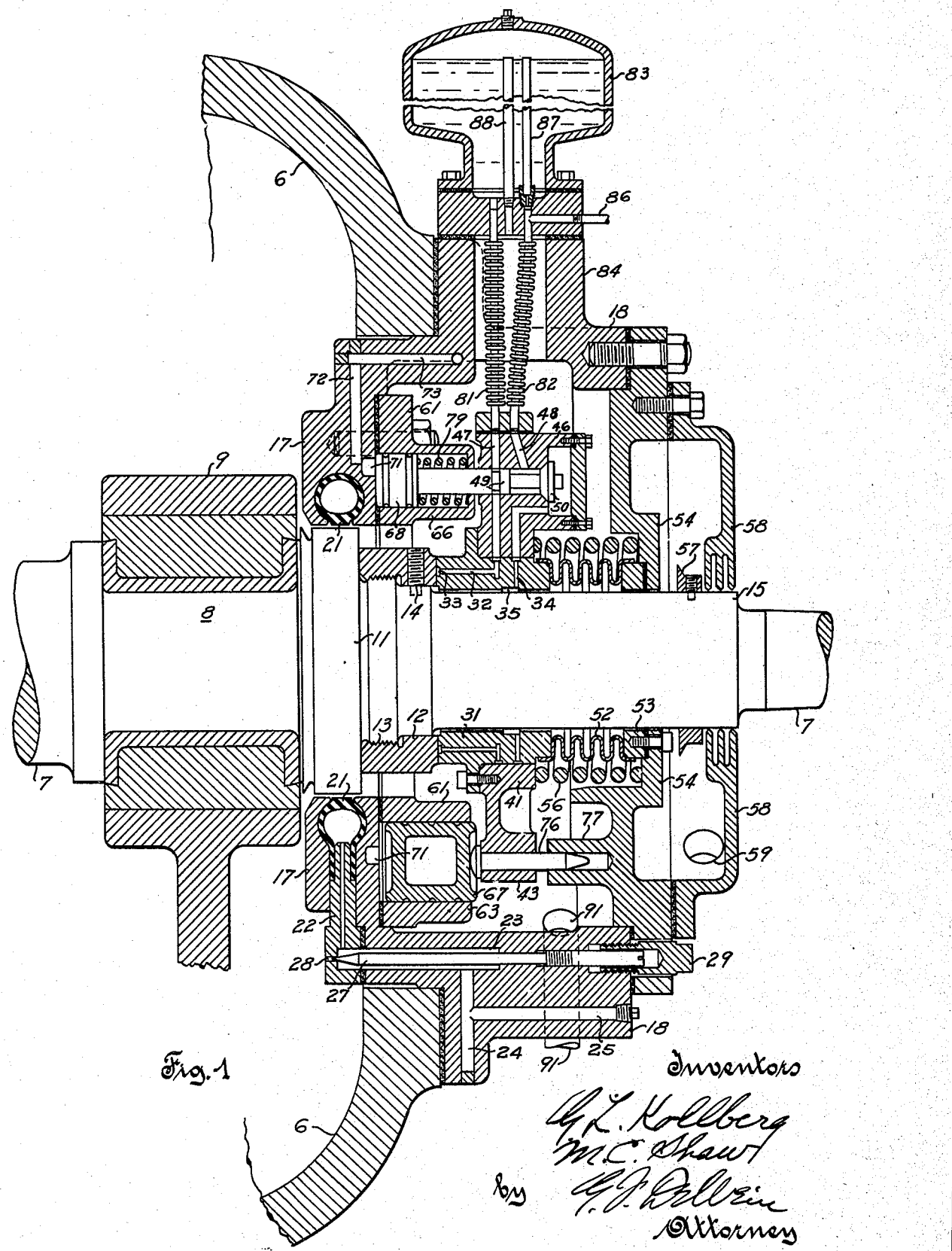

Oct. 27, 1942.  G. L. KOLLBERG ET AL  2,300,385
ROTARY SHAFT SEAL
Filed July 17, 1940  2 Sheets-Sheet 1

Inventors
G. L. Kollberg
M. C. Shaw
by
Attorney

Oct. 27, 1942.   G. L. KOLLBERG ET AL   2,300,385
ROTARY SHAFT SEAL
Filed July 17, 1940   2 Sheets-Sheet 2

Patented Oct. 27, 1942

2,300,385

UNITED STATES PATENT OFFICE 2,300,385

ROTARY SHAFT SEAL

Gustaf L. Kollberg, Milwaukee, and Melvin C. Shaw, Wauwatosa, Wis., assignors to Allis-Chalmers Manufacturing Company, Milwaukee, Wis., a corporation of Delaware Application July 17, 1940, Serial No. 345,904

11 Claims. (Cl. 286—11)

This invention relates to improvements in seals between relatively moving parts and particularly to such seals in which the sealing surfaces are required to be held out of contact with each other during relative movement of the parts forming the joint to be sealed and are to be brought into close contact with each other when the relatively moving parts to be sealed are at a standstill.

A joint between relatively moving parts such as the stationary casing and the rotating shaft of a machine must be sealed when the casing contains fluid under pressure or is under vacuum relative to the surrounding atmosphere and such seal is particularly important when the fluid is a costly gas which must be prevented from leaking out of the seal or must be kept uncontaminted by air leaking into the casing to secure proper operation of the machine. The problem of sealing such joints is very much complicated when the speed between the relatively moving parts is high and when only a minimum of sealing fluid or lubricant may be employed, for any reason, between the surfaces to be sealed. At high relative speed, the sealing surfaces must be kept out of contact with each other and lubricant must be supplied between one set of sealing surfaces at a point of high pressure and allowed to flow between the sealing surfaces to a point of low pressure. When the machine is at standstill, another set of sealing surfaces may be brought into as close contact as is practical and lubricant may be supplied to a point between the edges of the sealing surfaces in only such quantities and under such pressure as will fill all of the voids remaining between the contacting surfaces. A seal designed to provide for movement of one set of sealing surfaces into and out of contact with each other dependent on whether the machine is in operation or is at standstill, that is, whether the sealing surfaces are in relative movement or not, should operate automatically responsive to a condition coincident with starting and stopping of the machine without any action whatever on the part of the machine operator. The sequence of seal moving operations should include separation and bringing together of the sealing surfaces as well as control of the oil flow between the surfaces to the different points dependent on the position of the movable portion of the seal relative to the non-movable portion.

Regardless of the excellence of design and workmanship and the material of which the normally operating sealing means may be made, it is desirable that means be provided by which the space or joint between the casing and the shaft may be closed off to permit repair and replacement of the normal seal without permitting leakage of gas from the machine or leakage of a material amount of air into the machine. Such emergency sealing means must therefore be entirely separate from the normal sealing means and must be capable of being brought into operating and disengaged from the exterior of the machine without in any way interfering with or being dependent on the normal sealing means. Means must of course also be provided for releasing the emergency seal and preventing any operation of such seal, when undesired, due to pressure conditions within the machine.

It is therefore among the objects of the present invention to provide a seal between relatively moving parts of a machine from which leakage of gas or into which leakage of air is to be prevented either during operation of the machine or during extended shutdown periods when the pressure relations externally and internally of the machine may vary within wide limits.

Another object of the invention is to provide a seal between relatively moving parts of a machine in which the sealing surfaces are formed in related sets to be severally employed during normal relative movement between the parts forming the joint to be sealed and during periods when the parts to be sealed are at a standstill relative to each other.

Another object of the invention is to provide a seal between relatively moving parts of a machine in which one set of the sealing surfaces remains in spaced relation at all times during operation of the machine and another set of sealing surfaces is brought into contact during standstill of the machine dependent upon a condition of the machine which invariably occurs during starting and stopping.

Another object of the invention is to provide a seal between relatively moving parts of a machine in which a sealing fluid is supplied to separate sets of sealing sufaces dependent on whether or not the parts to be sealed are in relative movement or are at a standstill relative to each other.

Another object of the invention is to provide a seal between relatively moving parts of a machine in which a seal operative both under relative movement and at standstill of the parts to be sealed has incorporated therewith an emergency seal which will allow removal and replacement of the normal seal without the loss of or contamination of fluid within the machine.

Figure 2:
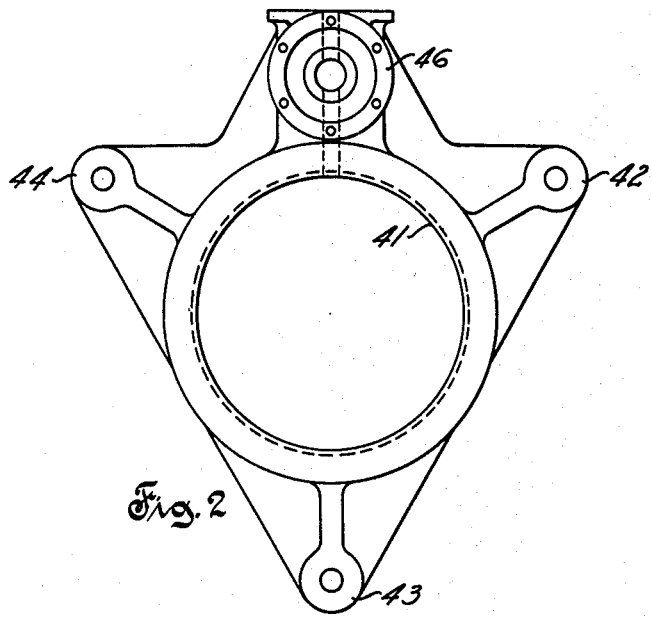
Figure 3:
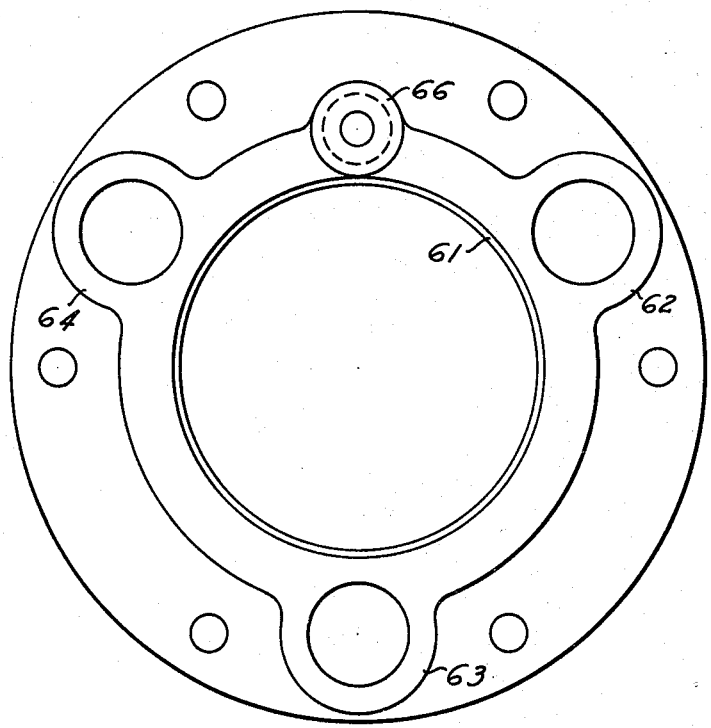

Objects and advantages other than those above set forth will be apparent from the following description when read in connection with the accompanying drawings, in which:

Fig. 1 is a vertical cross sectional view of a seal according to the present invention applied to the joint between a stationary casing and a rotating shaft and in which both a normal and emergency sealing means are incorporated within the same construction, and Fig. 2 is a plan view of a portion of the movable sealing part of the normal seal, and Fig. 3 is a plan view of a portion of the means for securing movement of the movable portion of the normal seal.

Referring more particularly to the drawings by characters of reference, the reference numeral 6 designates a stationary casing of a machine which contains gas at pressures ranging from approximately 5 to 10 pounds absolute and from which extends a rotating shaft 7 mounted at 8 in suitable bearings as at 9 within the casing. The shaft 7 is provided with a flange 11 exteriorly of the bearing 9, has ring 12 mounted in gas-tight relation on the shaft at 13 which ring is held against rotation relative to the shaft by a set screw 14 and the shaft has a reduced size portion 15 extending through and beyond the stationary casing. The space between the casing 6 and the shaft flange 11 is partially closed by a box or casing mounted on the machine casing 6 and comprising generally a substantially circular bottom portion 17 with substantially cylindrical wall portions 18 to receive the several sealing means for the joint between the shaft and the edge of the casing opening through which the shaft extends. The inner edge of the seal casing bottom 17 is formed with a groove having a substantially circular internal cross section but with an opening of less width than the diameter through the circular portion of the groove. The groove receives an endless tube 21 of one of the known resilient rubberlike materials not affected by the gas in the machine casing or by oil and extending entirely around the shaft 7. The tube 21 is shaped to occupy substantially the entire cross sectional area of the groove with a thickened wall portion extending into the groove opening and, in its retracted position, not protruding therefrom far enough to come into contact with the shaft. The tube 21 is connected with an inlet conduit 22 which is connected with passageways 23, 24 and 25 formed in the seal casing wall portion 18 and normally closed by a plug at the outer edge. A needle valve 27 extends through the passageway 23 and into an aperture 28 in the conduit 22 and has the outer end normally enclosed by a cap 29 which is removable to allow access to the valve 27 for movement of the valve to open or close the aperture 28 as may be required.

When the needle valve 27 is seated in the aperture 28 as shown, the plug may be removed from the end of the passageway 25 and an air hose or pump attached to such passage. Compressed air is then forced through the passageway 25, 24, 23, and the conduit 22 into the tube 21 to cause inflation of the tube and to force the tube into contact with the edge of the shaft flange 11, thus closing the annular space between the shaft flange 11 and the seal casing bottom portion 17 and, thereby preventing egress of gas from or ingress of air into machine casing 6. Use of the flange 11 and the tube 21 as an ordinary running seal to prevent leakage of gas from the casing 6 or into such casing, is not practical because of wear on the thickened portion of the tube which would eventually force replacement thereof which would require evacuation of the gas from the entire machine casing 6 or the loss of such gas to the atmosphere. It is therefore desirable that the seal flange 11 and the tube 21 be held in reserve for use in cases of emergency when other sealing means associated therewith must be repaired or replaced. After an emergency condition has passed, the excess pressure of the tube 21 is released, thus permitting the tube to retract into the groove out of contact with the edge of the shaft flange 11. The plug is then replaced in passageway 25 and the needle valve 27 is turned to open the aperture 28 for the purpose of equalizing the pressure on the exterior and interior surfaces of the tube 21, thereby allowing the return of the tube to precisely its original position.

A collar 31 is mounted on the shaft portion 15 in close running but sliding relation to the shaft and exteriorly of the ring 12 which has its outer end surface formed to a substantially plane surface perpendicular to the periphery of the shaft. The collar 31 is formed with an external flange and is provided with a passageway 32 therethrough leading to a groove 33 in the end of the collar adjacent the end of the shaft ring 12 and with a passage 34 leading therethrough to the groove 35 in the inner surface of the collar adjacent the peripheral surface of the shaft portion 15. The adjacent faces of the ring 12 and the collar 31 are carefully finished to provide as nearly perfect as practical, plane surfaces which are parallel to each other and which will seat accurately on each other when the collar 31 is moved into contact with the ring 12. A ring 41 is mounted on the flange of the seal collar 31 and is formed with a plurality of similar apertured extensions 42, 43 and 44 (see Fig. 2) and with an extension 46 which is provided with a plurality of passageways 47 and 48 connecting respectively with the passageways 32 and 34 upon operation of valves 49 and 50 mounted on a single stem and arranged in the extension 46.

The outer end of the collar 31 is connected by a fluid-tight joint with a corrugated and preferably metallic cylinder 52 which is flexible, compressible and expansible as is well known in the so-called metallic bellows. The outer end of the bellows 52 is connected by a fluid-tight joint with a ring 53 which is in turn mounted in fluidtight relation in a cover plate 54 for the seal casing 17, 18. A spring 56 under compression is located externally about the bellows 52 and acts between the seal collar mounted ring 41 and the cover plate 54 to urge the collar 31 toward the sealing face of the shaft mounted ring 12 and to keep the bellows 52 in a normally expanded position. It will be apparent that leakage of gas out of or air into the machine casing 6 can take place only between the sealing surfaces of the shaft ring 12 and the seal collar 31 because all other points of access from the interior of the seal casing 17, 18 to the surface of the shaft portion 15 are sealed off by the bellows 52 and its connection to the cover plate 54 and by the connection of the cover plate 54 to seal casing wall 18 which seal casing is attached by a fluid tight joint to the machine casing 6. The leakage of oil along the shaft portion 15 to atmosphere beyond the seal casing is prevented by the location of an oil slinger 57 mounted exteriorly of the cover plate 54 and enclosed by a secondary cover plate 58 having a multiple flanged inner peripheral edge adjacent the shaft and forming a gland with the oil slinger for further retarding the flow of oil along the shaft.

A ring 61, see Fig. 3, is mounted on the bottom 17 of the seal casing and is formed with a plurality of similar cylindrical portions 62, 63 and 64 and with a cylindrical portion 66, all of such cylindrical portions extending from the ring toward the collar mounted ring 41. Each of the cylinders 62, 63 and 64 receives a piston as at 67 and cylinder 66 receives a piston 68. The bottoms of all of the cylinders are interconnected by a groove 71 in the casing bottom portion 17 for admitting fluid under pressure, such as oil, beneath each of the pistons by way of the passageways 72 and 73 formed in the bottom 17 and the wall 18 of the seal casing. The passageways 73, 72 and the groove 71 are supplied with fluid pressure from a suitable source (not shown) of pressure fluid to the machine itself. The pistons 67 are so proportioned as to be in contact with pins as at 76 severally extending through the apertured extensions 42, 43 and 44 of the seal collar mounted ring 41, see Fig. 2, and severally extending into cylindrical extensions 77 from the cover plate 54. The cylinders 62, 63 and 64 with their pistons 67 form a plurality of servomotors for moving the end of seal collar 31 out of contact with the shaft ring 12 upon the admission of oil under pressure to the cylinders below the pistons. The action of the above servomotor means for moving the sealing collar 31 out of contact with the shaft ring 12 is opposed by spring 56 which tends to retain the adjacent surfaces of the collar 31 and ring 12 in sealing relation. The servomotors and the spring therefore form means for moving the collar 31 into and out of contact with the ring 12 dependent on the presence or absence of oil pressure acting on the servomotors. The pins 76 with their mountings 42, 43 and 44 and extensions into the cylinders 77 form means for guiding the collar 31 in its movements, thus retaining the adjacent surfaces of the collar 31 and the ring 12 in parallelism and keeping the collar 31 at its predetermined spacing from the periphery of the shaft portion 15 and preventing rotation thereof. The piston 68 is connected with the stem of valves 49 and 50 and is forced toward, in the absence of oil pressure, the bottom of its cylinder 66 by spring 79 which is under compression. The spring, in the absence of oil pressure in groove 71, retains the valve 50 on its seat to shut off the passageway 48 and so positions valve 49 as to keep the passageway 47 open. The valves and the piston and the spring operating mechanism therefor accordingly form means for controlling the flow of lubricant to either of the two sealing surfaces of the collar 31 and adjacent the ring 12 or to the periphery of the shaft portion 15, dependent on the supply of fluid pressure below the piston 68 which fluid pressure is normally supplied from the lubricant pump supplying the machine and which pump must be operated coincidentally with starting and stopping of the machine or just prior thereto.

The passageways 47 and 48 are connected respectively by flexible conduits 81 and 82 with an oil reservoir 83 mounted on a tubular portion 84 of the seal casing wall 18 extending upwardly from the casing. Oil is supplied to the reservoir 83 from a suitable pressure source, such as the lubricant pump for the machine, by way of a pipe 86 which discharges into both the conduit 82 and a pipe 87 extending to adjacent the top of the reservoir. The conduit 81 leads from the bottom of the reservoir 83 and the oil level in the reservoir is determined by the height of a pipe 88 discharging into the seal casing 17, 18 from which excess oil is drained back to the oil pump by way of a pipe 91. The oil pressure pump for lubricating purposes therefore is connected for the direct supply of oil, under pressure and under control of the valve 50, to the seal formed by the adjacent surfaces of the collar 31 and the peripheral surface of the shaft portion 15 when the machine is in operation. The reservoir 83 forms an intermediate source of oil under hydraulic head pressure only for supply to the adjacent faces of ring 12 and collar 31, under the control of valve 49, when no oil under pump pressure is available as when the machine is not operating. Means are accordingly provided for supplying oil to either of two sets of sealing surfaces dependent on whether or not such surfaces are in relative movement. Either the full oil pressure is supplied to one set of surfaces moving relative to each other or a low pressure oil supply is connected to the other set of surfaces not in motion and in contact with each other. The contacting surfaces are formed as substantial planes in parallelism with each other thus minimizing the amount of oil required to fill any void between such surfaces and making it possible to rely on the reservoir 83 for a sufficient quantity of oil to secure complete sealing for long periods when it may be desirable to shut down the machine.

When the machine is at standstill, under normal operating conditions no oil pressure is available from the lubricant pump and the several portions of the seal are in the positions shown in the drawing. The sealing face of the shaft ring 12 and the sealing collar 31 are pressed on each other by the spring 56. The pistons 67 are pressed toward the bottom of their cylinders 62, 63 and 64 by movement of sealing collar ring 41 under the action of the spring 56 and the piston 68 is pressed toward the bottom of its cylinder 66 by the spring 79 to close the passageway 48 and to open the passageway 47. Oil then flows through conduit 81, and passageways 47, and 32 to the groove 33 in the end of the seal collar 31 from which any tendency of gas or air leakage between the sealing faces in either direction merely forces oil between such surfaces. It is therefore apparent that any imperfections in the contact between the ends of the shaft ring 12 and the sealing collar 31 are filled with oil which provides a fluid seal against any leakage of gas from the casing and such fluid seal is retained as long as the reservoir 83 contains oil.

When the machine is to be operated, the lubricant pump for the machine is started either prior to or simultaneously with starting of the machine, to supply oil pressure through the passageways 73, 72 to the groove 71. Such pressure raises the pistons 67 in cylinders 62, 63 and 64 against pins 76 and forces ring 41 and the attached sealing collar 31 toward the right to move the adjacent sealing surfaces of the shaft ring 12 and the seal 31 out of contact with each other against the action of the spring 56. The piston 68 is also forced toward the right to overcome the spring 79 and to close the passageway 47 and to open the passageway 48. Oil is then supplied by way of the pipe 86, conduit 82 and passageways 48 and 34 to the groove 35 from which the oil is distributed in both directions along the surface of the shaft portion 15 into the interior of the seal casing 17 and 18, from which the oil is returned to the lubricating pump by the drain 91. During operation therefore the relatively small space between the inner surface of the collar 31 and the periphery of the shaft portion 15 is completely filled with oil under the full pressure of the lubricant pump to prevent leakage of air into the machine and to supply oil under pressure between the relatively moving sealing surfaces for lubrication purposes.

When the machine is stopped, the lubricant pump is also stopped thus interrupting the supply of oil under pressure as above described. Spring 56 then immediately forces sealing collar 31 against the shaft ring 12 and forces the servomotor pistons 67 toward the bottom of their cylinders 62, 63 and 64. Spring 79 forces piston 68 toward the bottom of its cylinder 66, thereby bringing valve 50 to its seat and opening passageway 47 through valve 49. Oil is then supplied under the hydraulic head of the reservoir 83, which because of the very small quantity of oil flowing between the sealing surfaces then in contact with each other under the action of the spring 56, will maintain a perfect seal between such surfaces for a long period of time.

The present invention therefore provides a seal for the joint between relatively moving parts in which one set of sealing surfaces is moved out of contact when the machine is in operation and another sets of constantly spaced sealing surfaces functions during operation and in which another seal is brought into operation upon failure of the first mentioned seal or even in the absence of such first seal. The one set of surfaces of the first or primary seal is moved out of contact by fluid pressure operated means responsive to a condition occurring prior to or coincident with the starting of the machine and is automatically brought into contact when the supply of fluid pressure lubricant to the machine ceases or fails. The movement of one sealing member away from and toward another sealing member is guided to maintain each set of sealing surfaces in parallel, thus avoiding binding, loss of sealing or excessive flow of oil between either set of surfaces. Means are provided by which the sealing fluid is supplied between the several sets of sealing surfaces with automatic means controlling the supply of sealing fluid either directly from a source of fluid pressure or by way of an intermediate reservoir depending on the operating condition of the machine. The entire structure is so designed that the normal or primary seal may be repaired or replaced even while the machine is in operation, thus avoiding the delays heretofore required between operations of such machine when seal failure occurred. When the seal above described is used on a centrifugal blower compressing gas for cooling or refrigerating purposes, the seal may be inspected prior to each season's operation without loss of gas and without excessive air contamination of the gas merely by the use of the emergency or secondary seal without extensive dismantling or reassembling operations.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a seal for a machine having a rotating shaft extending through a wall of a casing, a resilient tube substantially enclosed in a groove in the casing adjacent to the shaft, the groove having an opening narrower than the width thereof below the opening, a conduit for conveying a fluid under pressure into said tube for expanding a portion of said tube through the groove opening into sealing contact with the shaft, and a manually operable valve controlling communication between the interior of the casing and of said tube for equalization of the pressure differences therebetween.

2. In a seal for a machine having a rotating shaft extending through a wall of a casing, a resilient tube arranged in a groove in the casing adjacent to and extending entirely around the shaft, the opening of the groove being narrowed down relative to the width thereof, a conduit for conveying a fluid under pressure into said tube from exteriorly of the casing for expanding a portion of said tube through the groove opening into sealing contact with the shaft, and a manually operable valve controlling communication between the interior of the casing and of said tube for equalization of the pressure differences therebetween.

3. In a seal for the joint between relatively moving parts of a machine, a first part having a plurality of surfaces, a second part having a plurality of surfaces cooperating severally with the surfaces of said first part to form sets of surfaces for sealing during relative movement and at standstill of said parts respectively, one of said sets of surfaces remaining out of contact at all times for sealing during relative movement only of said parts, means for relatively moving said parts to move one said surface of one said part into contact with one said surface of the other said part to form the said set of surfaces for sealing at standstill only of said parts, said means acting responsive to a condition associated with starting of the machine and means for alternately supplying sealing fluid to said sets of sealing surfaces when in sealing relation.

4. In a seal for the joint between relatively moving parts of a machine, a first part having a plurality of surfaces, a second part having a plurality of surfaces cooperating severally with the surfaces of said first part to form sets of surfaces for sealing during relative movement and at standstill of said parts respectively, one of said sets of surfaces remaining out of contact at all times for sealing during relative movement only of said parts, means for relatively moving said parts to move one said surface of one said part into contact with one said surface of the other said part to form the said set of surfaces for sealing at standstill only of said parts, means including a duct for supplying a high pressure sealing fluid to the said set of sealing surfaces remaining out of contact, and means including a duct and separate from said means supplying high pressure sealing fluid for supplying a low pressure sealing fluid to the said set of sealing surfaces movable into contact.

5. In a seal for the joint between relatively moving parts of a machine, a first part having a plurality of surfaces, a second part having a plurality of surfaces cooperating severally with the several surfaces of said first part to form sets of surfaces for sealing during relative movement and at standstill of said parts respectively, spring means for relatively moving said parts to bring one said surface of one said part into contact with one said surface of the other said part upon standstill of said parts, the other surfaces of said parts being in spaced relation at all times for sealing during relative movement only of said parts, a plurality of servomotors actuated responsive to operation of the machine for moving the one of said parts to withdraw the one said surface thereof from contact with the one said surface of the other said part upon relative movement of said parts, means for supplying sealing fluid to said sets of sealing surfaces, and means movable into position for controlling the flow of sealing fluid to said sets of surfaces.

6. In a seal for the joint between relatively moving parts of a machine, a first part having a plurality of surfaces, a second part having a plurality of surfaces cooperating severally with the several surfaces of said first part to form sets of surfaces for sealing during relative movement and at standstill of said parts respectively, spring means for moving said second part to bring one said surface thereof into contact with one said surface of said first part upon standstill of said parts, a plurality of servomotors actuated responsive to operation of the machine for moving said second part to withdraw the said surface thereof from contact with the said surface of said first part upon relative movement of said parts, means for guiding the movement of said second part to retain another said surface thereof in predetermined relation to another said surface of said first part for sealing during relative movement of said parts, means for supplying sealing fluid to said sets of sealing surfaces, and means movable into position for controlling the flow of sealing fluid to said sets of sealing surfaces, dependent on relative movement of said parts.

7. In a seal for the joint between relatively moving parts of a machine, a first part having a plurality of surfaces, a second part having a plurality of surfaces cooperating severally with the several surfaces of said first part to form sets of surfaces for sealing during relative movement and at standstill of said parts respectively and having apertured extensions therefrom, spring means for moving said second part to bring one said surface thereof into contact with one said surface of said first part upon standstill only of said parts, a plurality of servomotors actuated responsive to operation of the machine for moving said second part to withdraw the said surface thereof out of contact with the said surface of said first part upon relative movement of said parts, a plurality of pins extending through the extensions from said second part and severally engaged by the pistons of said servomotors, a plate mounted substantially perpendicular to the axis of said shaft and having cylindrical extensions therefrom to receive the ends of said pins for guiding the movement of said second part to retain one said surface thereof in spaced relation with said first part for sealing during relative movement only of said parts, means for supplying sealing fluid to said sets of sealing surfaces of said second part, and means for controlling the flow of sealing fluid to said sets of sealing surfaces dependent on relative movement between said parts.

8. In a seal for the joint between relatively moving parts of a machine, a first part having a pluraltiy of surfaces, a second part having a plurality of surfaces cooperating severally with the several surfaces of said first part to form sets of surfaces for sealing during relative movement and at standstill of said parts respectively, means for moving said second part to bring one said surface thereof into and out of contact with one said surface of said first part for sealing while in contact during standstill only of said parts, the other said set of surfaces remaining in constant spaced relation for sealing during relative movement only of said parts, a plurality of separate means for supplying sealing fluid to said sets of sealing surfaces respectively dependent on the position of said second part relative to said first part, and means movable into position for controlling the flow of sealing fluid to said sets of sealing surfaces dependent on relative movement of said parts.

9. In a seal for the joint between relatively moving parts of a machine, a first part having a plurality of surfaces, a second part having a plurality of surfaces cooperating severally with the several surfaces of said first part to form sets of surfaces for sealing during relative movement and at standstill of said parts respectively, means for moving said second part to bring one said surface thereof into and out of contact with one said surface of said first part to provide the said set of surfaces for sealing while in contact and at standstill only of said parts, means for supplying sealing fluid directly from a source of pressure to another said set of sealing surfaces remaining in spaced relation and cooperating for sealing during relative movement only of said parts, a reservoir for supplying sealing fluid under hydrostatic head to the surfaces of said parts cooperating for sealing during standstill of said parts, and means movable into position for controlling the flow of sealing fluid to the several said sets of sealing surfaces dependent on relative axial movement of said parts.

10. In a seal for the joint between relatively moving parts of a machine, a first part having a plurality of surfaces, a second part having a plurality of surfaces cooperating severally with the several surfaces of a second part to form sets of surfaces for sealing during relative movement and at standstill of said parts respectively, means for moving said second part to bring one said surface thereof into contact with one said surface of said first part to provide the said set of surfaces for sealing at standstill of said parts only, another said set of surfaces remaining in spaced relation for sealing during relative movement only of said parts, means for supplying sealing fluid to said several sets of sealing surfaces, and a valve operated dependent on the relative movement of said parts for controlling the flow of sealing fluid to said several sets of surfaces of said parts.

11. In a seal for the joint between relatively moving parts of a machine, a first part having a plurality of surfaces, a second part having a plurality of surfaces cooperating severally with the several surfaces of said first part to form sets of surfaces for sealing during relative movement and at standstill of said parts respectively, mean for moving said second part to bring one said surface thereof into contact with one said surface of said first part for sealing at standstill only of said parts, the other said surfaces of said parts remaining out of contact at all time for sealing during relative movement only of said parts, means for supplying sealing fluid to said sets of sealing surfaces, and a valve operated by oppositely acting spring pressure and fluid pressure dependent on relative movement of said parts for controlling the flow of sealing fluid to the said several sets of sealing surfaces of said parts.

GUSTAF L. KOLLBERG.
MELVIN C. SHAW.